(12) United States Patent
Kuwabara (10) Patent No.: US 9,540,934 B2
(45) Date of Patent: Jan. 10, 2017

(54) HOT PART OF GAS TURBINE, GAS TURBINE INCLUDING THE SAME, AND MANUFACTURING METHOD OF HOT PART OF GAS TURBINE

(71) Applicant: MITSUBISHI HITACHI POWER SYSTEMS, LTD., Kanagawa (JP)

(72) Inventor: Masamitsu Kuwabara, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/903,124

(22) PCT Filed: Jun. 25, 2015

(86) PCT No.: PCT/JP2015/068346
§ 371 (c)(1),
(2) Date: Jan. 6, 2016

(87) PCT Pub. No.: WO2016/021324
PCT Pub. Date: Feb. 11, 2016

(65) Prior Publication Data
US 2016/0222786 A1    Aug. 4, 2016

(30) Foreign Application Priority Data
Aug. 4, 2014 (JP) .................................. 2014-158535

(51) Int. Cl.
*F01D 5/08* (2006.01)
*F01D 9/02* (2006.01)
(Continued)

(52) U.S. Cl.
CPC ................. *F01D 5/081* (2013.01); *F01D 5/18* (2013.01); *F01D 9/02* (2013.01); *F01D 25/12* (2013.01);
(Continued)

(58) Field of Classification Search
CPC .............. F01D 5/18; F01D 5/081; F01D 9/02; F01D 25/12; F02C 7/00; F02C 7/18; F05D 2220/32; F05D 2240/127; F05D 2240/305; F05D 2260/201; F05D 2260/2212
See application file for complete search history.

(56) References Cited

U.S. PATENT DOCUMENTS

| | | | |
|---|---|---|---|
| 5,957,657 A * | 9/1999 | Akita | ...................... F01D 5/187 219/69.17 |
| 6,089,822 A | 7/2000 | Fukuno | |
| 2001/0021343 A1 | 9/2001 | Kuwabara et al. | |

FOREIGN PATENT DOCUMENTS

| | | |
|---|---|---|
| EP | 0 911 486 | 4/1999 |
| EP | 1 132 574 | 9/2001 |
| | (Continued) | |

OTHER PUBLICATIONS

First Office Action issued Jun. 27, 2016 in corresponding Chinese Application No. 201580001299.5 (with English translation).
(Continued)

*Primary Examiner* — Richard Edgar
(74) *Attorney, Agent, or Firm* — Wenderoth, Lind & Ponack, L.L.P.

(57) ABSTRACT

A hot part (450) of a gas turbine includes a planar member having a gas path surface (451) that faces at least one of an inner side and an outer side in a radial direction of the rotor in a combustion gas flow path. A cooling flow path is formed in an interior of the planar member along an outer peripheral surface (452) that intersects the gas path surface (451). The planar member has an outer peripheral surface side turbulator (482) that protrudes from an inner surface on an outer peripheral surface (452) side of the cooling flow path.

6 Claims, 7 Drawing Sheets

(51) Int. Cl.
*F01D 25/12* (2006.01)
*F02C 7/00* (2006.01)
*F02C 7/18* (2006.01)
*F01D 5/18* (2006.01)

(52) U.S. Cl.
CPC . *F02C 7/00* (2013.01); *F02C 7/18* (2013.01); *F05D 2220/32* (2013.01); *F05D 2240/127* (2013.01); *F05D 2240/305* (2013.01); *F05D 2260/201* (2013.01); *F05D 2260/2212* (2013.01)

(56) References Cited

FOREIGN PATENT DOCUMENTS

| EP | 1 621 730 | 2/2006 |
|----|-----------|--------|
| JP | 9-228803 | 9/1997 |
| JP | 10-184309 | 7/1998 |
| JP | 10-184310 | 7/1998 |
| JP | 11-132005 | 5/1999 |
| JP | 2001-254605 | 9/2001 |
| JP | 3495579 | 2/2004 |
| JP | 2006-188962 | 7/2006 |
| JP | 2008-229841 | 10/2008 |
| JP | 2013-64412 | 4/2013 |
| JP | 2013-245675 | 12/2013 |
| WO | 2004/035992 | 4/2004 |

OTHER PUBLICATIONS

Extended European Search Report issued Jul. 29, 2016 in corresponding European Application No. 15816353.5.
International Search Report issued Jul. 28, 2015 in corresponding International Application No. PCT/JP2015/068346.
Written Opinion of the International Searching Authority issued Jul. 28, 2015 in corresponding International Application No. PCT/JP2015/068346 (with English translation).
Notice of Reasons for Rejection issued Sep. 16, 2014 in Japanese Application No. 2014-158535 (with English translation).

* cited by examiner

HOT PART OF GAS TURBINE, GAS TURBINE INCLUDING THE SAME, AND MANUFACTURING METHOD OF HOT PART OF GAS TURBINE

TECHNICAL FIELD

The present invention relates to a hot part of a gas turbine, a gas turbine including the same, and a manufacturing method of a hot part of a gas turbine.

This application claims priority based on Japanese Patent Application No. 2014-158535 filed in Japan on Aug. 4, 2014, of which the contents are incorporated herein by reference.

BACKGROUND ART

In a gas turbine, air pressurized in a compressor is mixed with a fuel in a combustor, generating a combustion gas which is a high-temperature fluid. The combustion gas is introduced into a combustion gas flow path of a turbine in which vanes and blades are alternately disposed. In the turbine, the blades and a rotor are rotated by the combustion gas that flows through the combustion gas flow path. As a result, the turbine converts the energy of the combustion gas into rotational energy, and applies a rotational driving force to the compressor and a power generator.

The combustion gas flow path through which the combustion gas flows is surrounded by a wall portion on an inner peripheral side and an outer peripheral side, and forms a ring shape. The wall portion of the combustion gas flow path is formed by arranging planar hot parts in a circumferential direction and an axial direction. Specifically, on the inner peripheral side of the combustion gas flow path, inner shrouds attached to vane base ends are arranged in the circumferential direction in a ring shape. In addition, on the inner peripheral side of the combustion gas flow path, platforms attached to blade base ends are arranged in the circumferential direction in a ring shape, in a position adjacent to the inner shrouds in the axial direction along the combustion gas flow path. Accordingly, ring-shaped bodies of the inner shrouds and the platforms are alternately arranged in the axial direction of the rotor, and constitute the wall portion on the inner peripheral side. On the outer peripheral side of the combustion gas flow path, outer shrouds attached to vane leading ends are arranged in the circumferential direction in a ring shape. In addition, on the outer peripheral side of the combustion gas flow path, ring segments curved in an arc shape are arranged in the circumferential direction in a ring shape, in a position adjacent to the outer shrouds in the axial direction along the combustion gas flow path. Accordingly, the ring-shaped bodies of the outer shrouds and the ring segments are alternately arranged in the axial direction, and constitute the wall portion on the outer peripheral side.

The hot parts that constitute such a combustion gas flow path and come into contact with the high-temperature combustion gas are cooled utilizing a portion of the compressed air as cooling air. Examples of a structure for cooling the hot parts of the gas turbine include a cooling structure disclosed in Patent Literature 1. In this cooling structure, a cooling air flow path that extends in the axial direction is formed in an end surface of a shroud of a vane. Specifically, a channel that extends in the axial direction is formed in the end surface of the shroud of the vane. An opening of this channel is blocked by a plug, thereby forming the cooling air flow path that extends in the axial direction.

CITATION LIST

Patent Literature

Patent Literature 1: Japanese Unexamined Patent Application Publication No. H09-228803A

SUMMARY OF INVENTION

Technical Problem

However, because the hot parts such as the outer shrouds and the inner shrouds of the vanes as well as the ring segments described above are adjacent to other hot parts in the axial direction, gaps are formed in the axial direction. These hot parts are arranged in ring shapes so as to be adjacent to each other, which forms a gap between the hot parts in the circumferential direction of the rotor. The combustion gas that flows through the combustion gas flow path enters the gaps in the axial direction and the circumferential direction. As a result, each hot part becomes high in temperature not only on a gas path surface facing the combustion gas flow path, but also on an outer peripheral surface surrounding the gas path surface. Thus, preferably, the outer peripheral surface of the hot part is efficiently cooled.

An object of the present invention is to provide a hot part of a gas turbine of which an outer peripheral surface can be efficiently cooled, a gas turbine that includes the hot part of a gas turbine, and a manufacturing method of a hot part of a gas turbine.

Solution to Problem

A hot part of a gas turbine of a first aspect of the present invention defines, around a rotor, a ring-shaped combustion gas flow path through which combustion gas flows. The hot part of a gas turbine includes a planar member having a gas path surface that faces at least one of an inner side and an outer side in a radial direction of the rotor in the combustion gas flow path. The planar member includes a cooling flow path that is formed along an outer peripheral surface that intersects the gas path surface. The planar member has an outer peripheral surface side turbulator that protrudes from an inner surface on the outer peripheral surface side of the cooling flow path.

According to such a configuration, the outer peripheral surface side turbulator that protrudes from the inner surface on the outer peripheral surface side of the cooling flow path is formed. Thus, cooling air flows through the cooling flow path while colliding with the outer peripheral surface side turbulator. The cooling air collides with the outer peripheral surface side turbulator, making it possible to disturb a flow of the cooling air so as to destroy a boundary layer of the cooling air that occurs along the inner surface on the outer peripheral surface side of the cooling flow path. Thus, a flow rate of the cooling air that flows near the inner surface on the outer peripheral surface side of the cooling flow path increases, making it possible to improve heat conductivity on the outer peripheral surface side.

The hot part of a gas turbine may further include a gas path surface side turbulator that protrudes from an inner surface on the gas path surface side of the cooling flow path.

According to such a configuration, the gas path surface side turbulator that protrudes from the inner surface on the gas path side of the cooling flow path is formed. Thus, the cooling air flows through the cooling flow path while colliding with the gas path surface side turbulator. The cooling air collides with the gas path surface side turbulator, making it possible to disturb the flow of the cooling air so as to destroy a boundary layer of the cooling air that occurs along the inner surface on the gas path surface side of the cooling flow path. Thus, a flow rate of the cooling air that flows near the inner surface on the gas path surface side of the cooling flow path increases, making it possible to improve heat conductivity on the gas path surface side. Accordingly, the gas path surface of the hot part can be efficiently cooled.

In the hot part of a gas turbine, the cooling flow path may be formed by a channel portion recessed from the outer peripheral surface of the planar member, and a cover portion that blocks an opening of the channel portion. The outer peripheral surface side turbulator may be provided on the cover portion.

According to such a configuration, the channel portion recessed from the outer peripheral surface is blocked by the cover portion, making it possible to easily form the cooling flow path. The outer peripheral surface side turbulator is formed on the cover portion separable from the planar member, making it possible to easily machine the outer peripheral surface side turbulator. Accordingly, the outer peripheral surface side turbulator can be easily formed inside the cooling flow path in any location and in any shape. As a result, the cooling flow path of which the outer peripheral surface can be efficiently cooled can be easily formed.

In the hot part of a gas turbine, the cooling flow path may be formed by a channel portion recessed from the outer peripheral surface of the planar member, and a cover portion that blocks an opening of the channel portion. The outer peripheral surface side turbulator may be provided on the cover portion, and the gas path surface side turbulator may be provided on the channel portion.

According to such a configuration, the gas path surface side turbulator that protrudes from the inner surface on the gas path surface side is formed on the channel portion hollowed from the outer peripheral surface. As a result, the gas path surface side turbulator can be easily formed. Specifically, the gas path surface side turbulator is formed so as to protrude from the inner surface on the gas path surface side connected to the opening of the channel portion, making it possible to easily machine the gas path surface side turbulator from the outer peripheral surface side. Accordingly, the gas path surface side turbulator can be easily formed inside the cooling flow path in any location and in any shape. As a result, the cooling flow path of which the gas path surface can be efficiently cooled can be easily formed.

In the hot part of a gas turbine, the cooling flow path may be formed by a channel portion recessed from the outer peripheral surface of the planar member, and a cover portion that blocks an opening of the channel portion. The outer peripheral surface side turbulator and the gas path surface side turbulator may be provided on the cover portion.

According to such a configuration, the gas path surface side turbulator is formed along with the outer peripheral surface side turbulator on the cover portion separable from the planar member. As a result, the gas path surface side turbulator can be easily machined. The cooling flow path can be formed by simply forming a simple cavity in the outer peripheral surface as the channel portion. Accordingly, the gas path surface side turbulator can be more easily formed inside the cooling flow path in any location and in any shape. As a result, the cooling flow path of which the gas path surface can be efficiently cooled can be more easily formed.

A gas turbine of a second aspect of the present invention includes the hot part of a gas turbine.

According to such a configuration, the outer peripheral surface can be efficiently cooled, making it possible to efficiently utilize the cooling air. Thus, an amount of the portion of the compressed air supplied to the turbine as cooling air can be decreased, making it possible to improve the efficiency of the gas turbine.

A manufacturing method of a hot part of a gas turbine of a third aspect of the present invention defines, around a rotor, a ring-shaped combustion gas flow path through which combustion gas flows. The manufacturing method of a hot part of a gas turbine includes a channel portion forming step of forming a channel portion recessed from an outer peripheral surface that intersects a gas path surface along the outer peripheral surface in a planar member, the planar member having the gas path surface that faces at least one of an inner side and an outer side in a radial direction of the rotor in the combustion gas flow path; a cover portion forming step of forming a cover portion that blocks an opening of the channel portion; and a cover portion fixing step of fixing the cover portion to the channel portion. In the cover portion forming step, an outer peripheral surface side turbulator that protrudes from the cover portion is formed. In the cover portion fixing step, the outer peripheral surface side turbulator is fixed toward the channel portion.

According to such a configuration, it is possible to form the outer peripheral surface side turbulator on the cover portion in the cover portion forming step while forming the channel portion from the outer peripheral surface side in the channel portion forming step. Thus, the outer peripheral surface side turbulator is formed on the cover portion separable from the planar member, making it possible to easily machine the outer peripheral surface side turbulator. In the cover portion fixing step, the cover portion is fixed to the channel portion, and the opening of the channel portion is blocked by the cover portion, making it possible to easily form the cooling flow path from the outer peripheral surface side. Accordingly, the cooling flow path having the outer peripheral surface side turbulator provided therein can be easily formed.

In the manufacturing method of a hot part of a gas turbine, the channel portion forming step may form a gas path surface side turbulator that protrudes from an inner surface on the gas path surface side of the channel portion by performing machining from the outer peripheral surface side.

According to such a configuration, the gas path surface side turbulator is formed along with the channel portion from the outer peripheral surface side in the channel portion forming step, making it possible to easily form the gas path surface side turbulator. As a result, the cooling flow path having the gas path surface side turbulator provided therein can be easily formed.

Advantageous Effects of Invention

According to a hot part of a gas turbine, a gas turbine including the hot part of a gas turbine, and a manufacturing method of a hot part of a gas turbine according to the present invention, a cooling flow path having an outer peripheral side turbulator provided therein is formed in an interior of the hot part, making it possible to efficiently cool an outer peripheral surface thereof.

DESCRIPTION OF EMBODIMENTS

[First Embodiment]

The following describes a first embodiment according to the present invention with reference to FIGS. 1 to 4.

Figure 1:
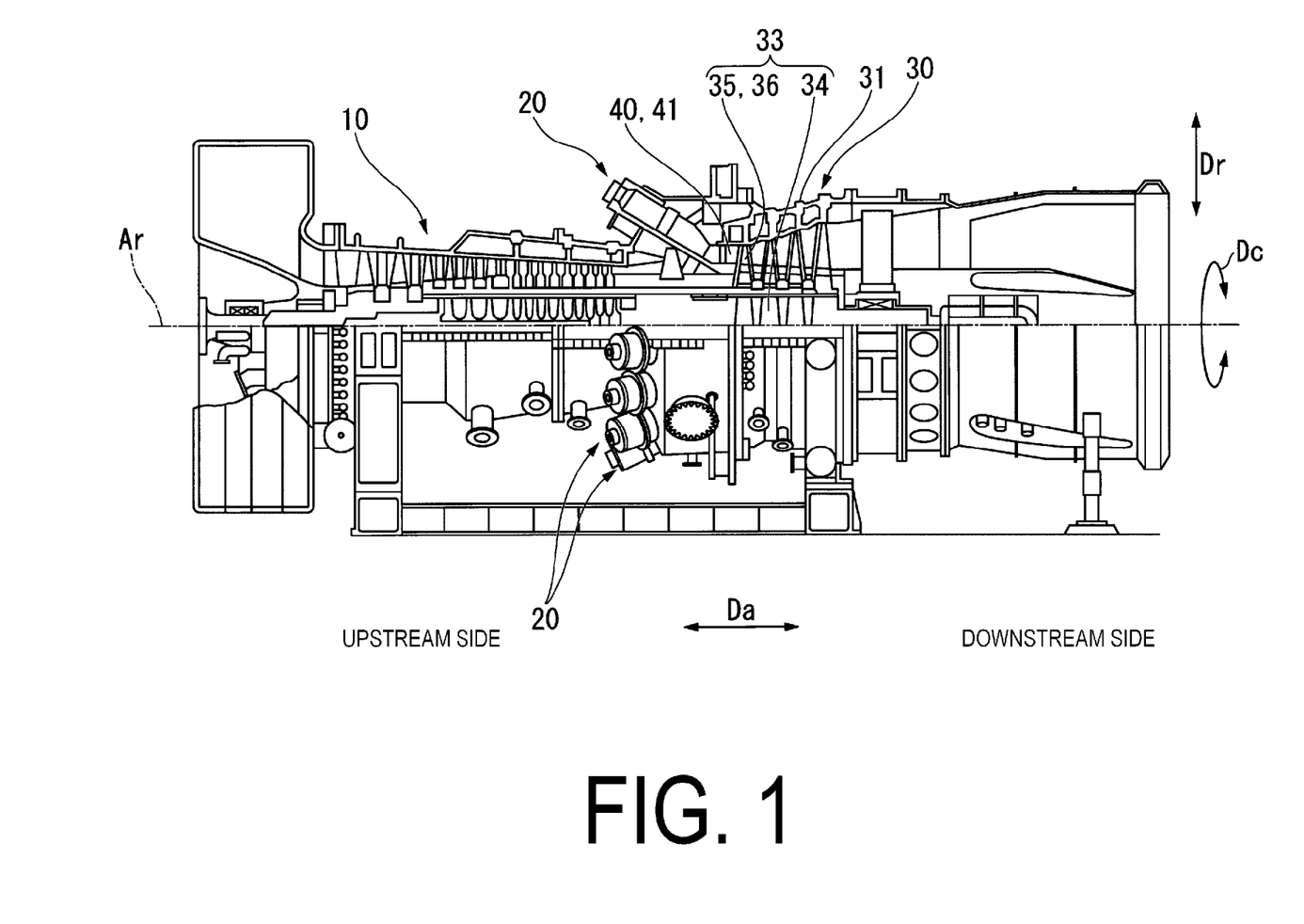
FIG. 1 is a cutaway side view of a main portion of a gas turbine of embodiments of the present invention.

As illustrated in FIG. 1, a gas turbine 1 is provided with a compressor 10 that generates compressed air by compressing outside air, a plurality of combustors 20 that generate a combustion gas G by combusting fuel supplied from a fuel supply source in the compressed air, and a turbine 30 driven by the combustion gas G.

The turbine 30 includes a casing 31, and a turbine rotor 33 that rotates inside this casing 31 about a rotor axis Ar. This turbine rotor 33 is, for example, connected to a generator (not illustrated) that generates power by the rotation of this turbine rotor 33.

The compressor 10 is disposed on one side of the turbine 30 in an axial direction Da parallel to the rotor axis Ar. The casing 31 of the turbine 30 forms a cylindrical shape with the rotor axis Ar as a center. The plurality of combustors 20 are attached to this casing 31 so as to be spaced from each other in a circumferential direction Dc with respect to the rotor axis Ar. The compressor 10 supplies a portion of the generated compressed air to the turbine 30 and the combustors 20 as cooling air.

It should be noted that, in the following, a side on which the compressor 10 is disposed in the axial direction Da is referred to as an upstream side, and the opposite side on which the turbine 30 is disposed is referred to as a downstream side. A side that is farther away from the rotor axis Ar in a radial direction Dr with respect to the rotor axis Ar is referred to as an outer side in the radial direction, and a side that is closer to the rotor axis Ar is referred to as an inner side in the radial direction.

Figure 2:
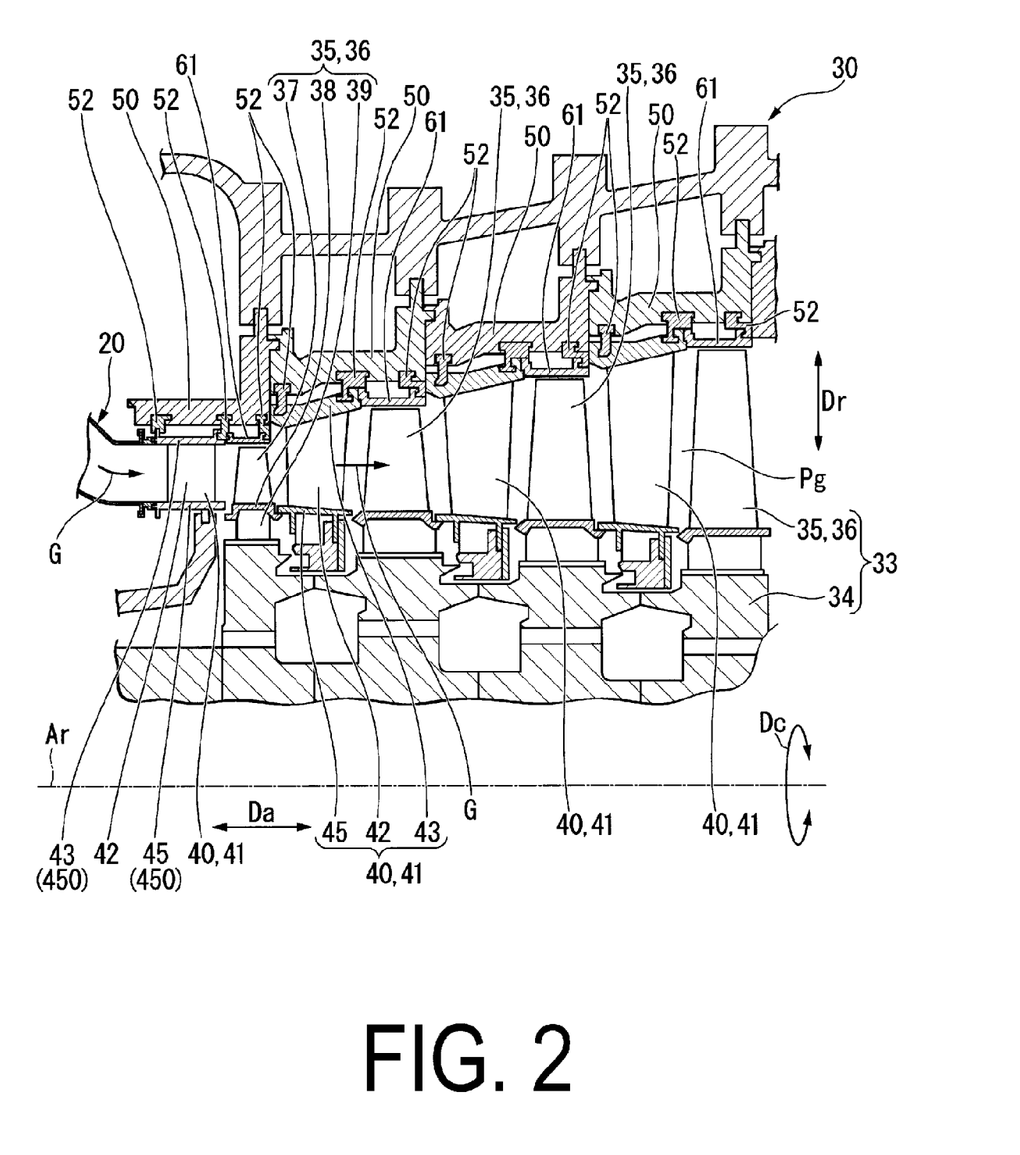
FIG. 2 is a cross-sectional view of the main portion of the gas turbine of the embodiments of the present invention.

The turbine rotor 33, as illustrated in FIG. 2, includes a rotor main body 34 that extends in the axial direction Da, and a plurality of blade rows 35 attached to the rotor body 34, side by side in the axial direction Da, with the rotor axis Ar as the center. Each of the blade rows 35 has a plurality of blades 36 attached to the rotor axis Ar, side by side in the circumferential direction Dc with respect to the rotor axis Ar. The blade 36 includes a blade body 37 that extends in the radial direction Dr, a platform 38 that is provided on the inner side in the radial direction of this blade body 37, and a blade root 39 that is provided on the inner side in the radial direction of this platform 38. This blade root 39 is embedded into the rotor body 34, thereby fixing the blade 36 to the rotor body 34.

A vane row 40 is disposed on the upstream side of each of the plurality of blade rows 35. Each of the vane rows 40 is composed of a plurality of vanes 41 arranged side by side in the circumferential direction Dc. Each of the vanes 41 has a vane body 42 extending in the radial direction Dr, an outer shroud 43 provided on the outer side in the radial direction of the vane body 42, and an inner shroud 45 provided on the inner side in the radial direction of the vane body 42.

A cylindrical blade ring 50 with the rotor axis Ar as the center is disposed on the outer side in the radial direction of the blade rows 35 and the vane rows 40, on the inner side in the radial direction of the casing 31. This blade ring 50 is fixed to the casing 31. The outer shroud 43 of the vane 41 and the blade ring 50 are connected by a heat shield ring 52.

A plurality of ring segments 61 arranged side by side in the circumferential direction Dc with the rotor axis Ar as the center are disposed between the outer shrouds 43 of the vane rows 40 adjacent to each other in the axial direction Da. The plurality of ring segments 61 arranged side by side in the circumferential direction Dc form a ring shape. The blade rows 35 are disposed on the inner side in the radial direction of the ring segments 61. The plurality of ring segments 61 arranged side by side in the circumferential direction Dc are each connected to the blade ring 50 by the heat shield ring 52.

A combustion gas flow path Pg through which the combustion gas G flows is formed inside the casing 31 of the turbine 30. The combustion gas flow path Pg is defined in a ring shape around the rotor body 34 by the inner shrouds 45 and the outer shrouds 43 of the plurality of vanes 41 constituting the vane rows 40, and the platforms 38 of the plurality of blades 36 constituting the blade rows 35 as well as the ring segments 61 opposing the platforms 38 on the downstream side of the inner shrouds 45 and the outer shrouds 43. The vanes 41, the blades 36, and the ring segments 61 are all hot parts of the gas turbine 1 that come into contact with the high-temperature, high-pressure combustion gas G that flows through the combustion gas flow path Pg.

Figure 3:
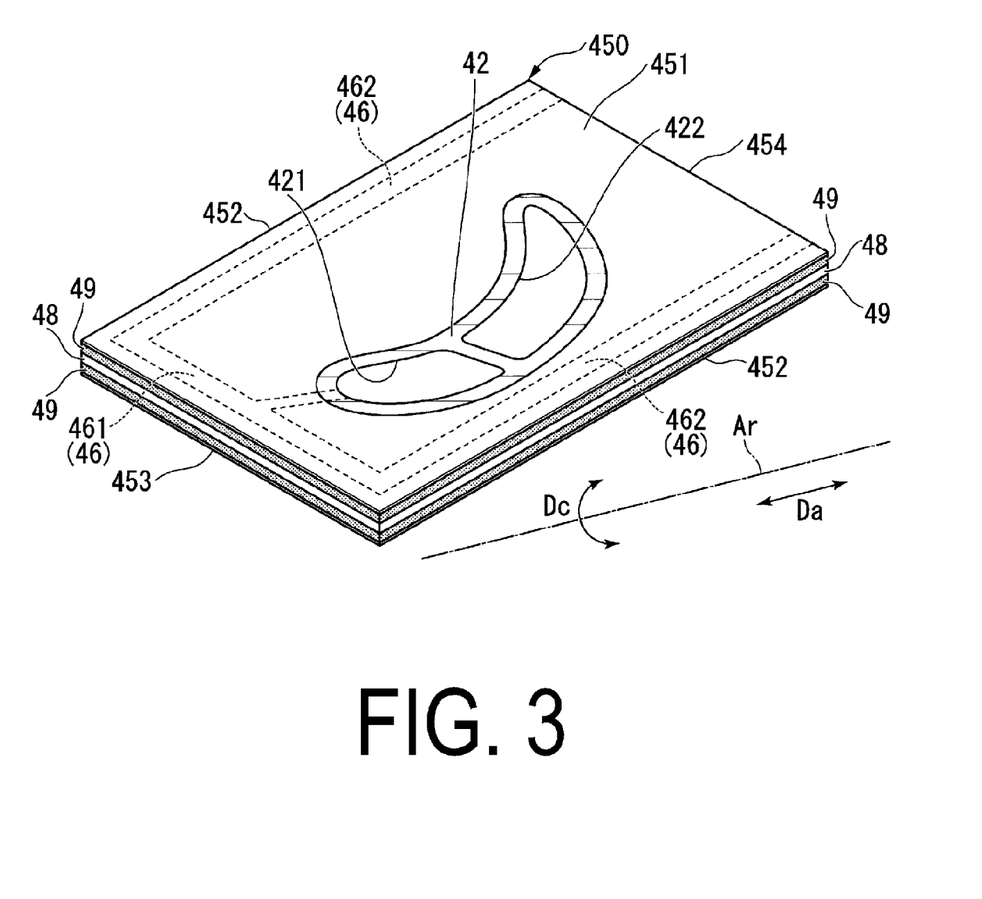
FIG. 3 is a schematic view illustrating an outline shape of an inner shroud (hot part) of the gas turbine of the embodiments of the present invention.

Next, one embodiment of the hot part according to the present invention will be described with reference to FIG. 3 and FIG. 4.

In this embodiment, the hot part will be described using a shroud 450, which is regarded as the outer shroud 43 and the inner shroud 45 of the vane 41 that constitutes a part of the vane row 40, as an example.

The shroud 450 is a planar member having a gas path surface 451 that faces an inner side in the radial direction Dr of the rotor axis Ar in the combustion gas flow path Pg of the present embodiment. The shroud 450 forms a planar shape curved into an arc shape with the rotor axis Ar as the center. FIG. 3 is a schematic view illustrating the outline shape of the shroud 450 of the present embodiment. In the shroud 450, the vane body 42 integrally protrudes from the gas path surface 451 toward the outer side in the radial direction. In the shroud 450 of the present embodiment, side end surfaces 452 that are oriented in the circumferential direction Dc with the rotor serving as reference, and a front edge end surface 453 that is oriented to the upstream side as well as a rear edge end surface 454 that is oriented to the downstream side in the axial direction Da with the rotor serving as reference are formed as an outer peripheral surface that intersects the gas path surface 451. That is, in the shroud 450, the side end surfaces 452 are surfaces that intersect the gas path surface 451 at end portions in the circumferential direction Dc of the gas path surface 451, and extend long in the axial direction Da. The front edge end surface 453 is a surface that intersects the gas path surface 451 at an end portion on the upstream side in the axial direction Da of the gas path surface 451, and extends long in the circumferential direction Dc. The rear edge end surface 454 is a surface that intersects the gas path surface 451 at an end portion on the downstream side in the axial direction Da of the gas path surface 451, and extends long in the circumferential direction Dc.

A cooling flow path 46 through which the cooling air flows is formed in the interior of the shroud 450.

The cooling flow path 46 of the present embodiment is formed along the side end surfaces 452 in the interior of the shroud 450. Specifically, as illustrated in FIG. 3, in the present embodiment, a front edge passage 421 and a rear edge passage 422 for circulating the cooling air are formed in the interior of the vane body 42. The cooling flow path 46 of the present embodiment includes a connecting flow path 461 that communicates with this front edge passage 421, and a main cooling flow path 462 formed along both the side end surfaces 452.

The connecting flow path 461 is formed in the interior of the shroud 450, extending from the front edge passage 421 toward the front edge end surface 453 and then branching so as to extend toward both the side end surfaces 452 along the front edge end surface 453.

The main cooling flow path 462 is connected to the connecting flow path 461. The main cooling flow path 462 is formed along both the side end surfaces 452. The front edge end surface 453 side of the main cooling flow path 462 of the present embodiment is connected to the connecting flow path 461. The front edge end surface 453 side of the main cooling flow path 462 is connected to an opening formed in the rear edge end surface 454.

Figure 4:
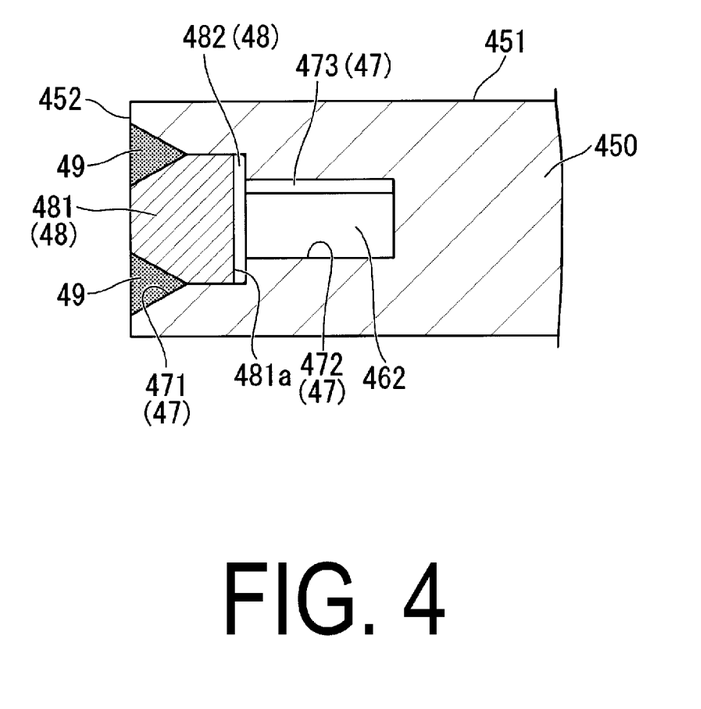
FIG. 4 is a cross-sectional view of a cooling flow path of a first embodiment of the present invention.

The shroud 450, as illustrated in FIG. 4, includes a channel portion 47 recessed from the side end surfaces 452 and the front edge end surface 453 serving as the outer peripheral surface of the planar member, and a cover portion 48 that blocks an opening of the channel portion 47. The cooling flow path 46 is formed by the channel portion 47 and the cover portion 48 along the side end surfaces 452 and the front edge end surface 453 in the interior of the shroud 450.

The channel portion 47 is formed from the front edge end surface 453 side to the rear edge end surface 454 along a direction that includes a component of the axial direction Da which is an extension direction of the side end surfaces 452. The channel portion 47 of the present embodiment is also formed between the side end surfaces 452 along a direction that includes a component of the circumferential direction Dc, which is an extension direction of the front edge end surface 453. The channel portion 47 of the present embodiment includes a first channel portion 471 to which the cover portion 48 is fitted, and a second channel portion 472 formed further in the interior of the shroud 450 than the first channel portion 471.

The first channel portion 471 is an angular channel hollowed vertically from the side end surfaces 452 and the front edge end surface 453.

The second channel portion 472 forms a cross-sectional shape that is smaller than that of the first channel portion 471. The second channel portion 472 is an angular channel hollowed vertically from an inner surface of the first channel portion 471 that is parallel to the side end surfaces 452 and the front edge end surface 453. The second channel portion 472 of this embodiment has a gas path surface side turbulator 473 formed on the inner surface thereof, which is adjacent to the gas path surface 451.

The gas path surface side turbulator 473 protrudes from the inner surface of the second channel portion 472 adjacent to the gas path surface 451. The gas path surface side turbulator 473 of the present embodiment forms a rectangular parallelepiped shape and protrudes from an opening adjacent to the first channel portion 471 toward the inner side, on the inner surface of the second channel portion 472 adjacent to the gas path surface 451. A plurality of the gas path surface side turbulators 473 of the channel portion 47 formed in the side end surfaces 452 are formed separated in the extension direction of the side end surfaces 452. A plurality of the gas path surface side turbulators 473 of the channel portion 47 formed in the front edge end surface 453 are formed separated in the extension direction of the front edge end surface 453.

The cover portion 48 that blocks the opening of the channel portion 47 formed in the side end surfaces 452 is formed extending from the front edge end surface 453 side to the rear edge end surface 454 along each of the side end surfaces 452. The cover portion 48 that blocks the opening of the channel portion 47 formed in the front edge end surface 453 is formed extending between the side end surfaces 452 along the front edge end surface 453. The cover portion 48 of the present embodiment includes a cover portion body 481 formed so as to be fitted into the first channel portion 471, and an outer peripheral surface side turbulator 482 that protrudes toward the second channel portion 472 with the cover portion body 481 fitted into the first channel portion 471.

The cover portion body 481 extends in the extension direction of the side end surfaces 452 and the front edge end surface 453 so as to be fitted into the first channel portion 471. With the cover portion body 481 fitted into the first channel portion 471, a channel portion blocking surface 481a that is a flat surface blocking the opening of the second channel portion 472 is formed on the second channel portion 472 side of the cross-sectional shape of the cover portion body 481. The cover portion body 481 is formed so as to decrease in diameter toward an outer side of the cross-sectional shape. For example, the cover portion body 481 disposed on the side end surface 452 is formed so that the side end surface 452 side, which is the outer side of the cross-sectional shape, decreases in diameter toward the side end surface 452 side.

The outer peripheral surface side turbulator 482 protrudes from the channel portion blocking surface 481a of the cover portion body 481. Accordingly, the outer peripheral surface side turbulator 482, with the cover portion body 481 fitted into the first channel portion 471, protrudes from the side end surface 452 side and the front edge end surface 453 side of the cooling flow path 46. The outer peripheral surface side turbulator 482 forms a rectangular parallelepiped shape and protrudes from the channel portion blocking surface 481a so as to cross the channel portion blocking surface 481a in a width direction. A plurality of the outer peripheral surface side turbulators 482 are formed separated along an extension direction of the cover portion body 481.

Next, a manufacturing method of a hot part of the gas turbine 1 of the present embodiment will be described.

In the manufacturing method of a hot part of the gas turbine 1, manufactured is a hot part of the gas turbine 1 that defines the combustion gas flow path Pg through which the combustion gas G flows around the rotor body 34. The manufacturing method of a hot part of the gas turbine 1 of the present embodiment is described using the manufacture of the shroud 450, which is a planar member, as an example. The manufacturing method of a hot part of the gas turbine 1 of the present embodiment includes a channel portion forming step S1 of forming the channel portion 47 recessed from the outer peripheral surface in the shroud 450, a cover portion forming step S2 of forming the cover portion 48 that blocks the opening of the channel portion 47, and a cover portion fixing step S3 of fixing the cover portion 48 to the channel portion 47.

The channel portion forming step S1 forms the channel portion 47 in the side end surfaces 452 and the front edge end surface 453 of the shroud 450. In the channel portion forming step S1, the channel portion 47 is formed along the extension direction of the side end surfaces 452 by performing machining from the side end surface 452 sides. In the channel portion forming step S1, the channel portion 47 is formed along the extension direction of the front edge end surface 453 by performing machining from the front edge end surface 453 side. Specifically, the channel portion forming step S1 of the present embodiment forms the first channel portion 471 in the side end surfaces 452 by performing machining from the side end surface 452 sides. Subsequently, the channel portion forming step S1 performs machining from the side end surface 452 sides. Accordingly, the channel portion forming step S1 forms the second channel portion 472 hollowed from the inner surface of the first channel portion 471 parallel to the side end surfaces 452 while forming the gas path surface side turbulator 473 that protrudes from the inner surface on the gas path surface 451 side. More specifically, the channel portion forming step S1 of the present embodiment carves the shroud 450 from the side end surface 452 sides by electric discharge machining. As a result, the channel portion forming step S1 forms the first channel portion 471, the second channel portion 472, and the gas path surface side turbulator 473. Similarly, the channel portion forming step S1 of the present embodiment performs electric discharge machining from the front edge end surface 453 side. As a result, the channel portion forming step S1 forms the first channel portion 471, the second channel portion 472, and the gas path surface side turbulator 473 in the front edge end surface 453.

The cover portion forming step S2 forms the cover portion 48 to be fitted into the channel portion 47. In the cover portion forming step S2 of the present embodiment, the cover portion body 481 having such a shape that fits into the first channel portion 471 and blocks the opening of the second channel portion 472, and the outer peripheral surface side turbulator 482 that protrudes from the channel portion blocking surface 481*a* are formed. In the channel portion forming step S1, the cover portion body 481 is formed so that, with the cover portion body 481 fitted into the first channel portion 471, gaps with respect to the first channel portion 471 occur on the side end surface 452 sides and the front edge end surface 453 side of the cover portion body 481, without the cover portion body 481 protruding from the side end surfaces 452.

The cover portion fixing step S3 fixes the cover portion 48 formed in the cover portion forming step S2 to the channel portion 47 formed in the channel portion forming step S1 so that the outer peripheral surface side turbulator 482 faces the channel portion 47. The cover portion fixing step S3 of the present embodiment orients the outer peripheral surface side turbulator 482 to the second channel portion 472, and then fits the cover portion body 481 into the first channel portion 471. Subsequently, the cover portion fixing step S3 fixes the cover portion 48 by welding while forming a weld bead 49 so that the gaps between the cover portion body 481 and the first channel portion 471 are filled from the side end surface 452 sides and the front edge end surface 453 side.

Next, the action of the hot part of the gas turbine 1 will be described. According to the gas turbine 1 of the first embodiment, the compressed air fed from the compressor 10 enters the casing 31 of the turbine 30 and flows into the combustors 20. In the combustors 20, fuel supplied from outside along with this compressed air is combusted, generating the combustion gas G. This combustion gas G, while passing through the combustion gas flow path Pg, comes into contact with the blade body 37, causing the turbine rotor 33 to rotate about the rotor axis Ar. At this time, the combustion gas G that passes through the combustion gas flow path Pg flows to the downstream side while entering the gaps between adjacent hot parts, such as gaps in the circumferential direction Dc between the shrouds 450, and gaps in the axial direction Da between the shrouds 450 and the platforms 38.

A portion of the compressed air from the compressor 10 flows into a region on the inner side in the radial direction of the platform 38 and a region on the outer side in the radial direction of the blade ring 50 inside the casing 31 of the turbine 30 to cool the blade 36 and the vane 41 as cooling air. The cooling air that has flowed into the region on the inner side in the radial direction of the platform 38 cools the platform 38 and the blade body 37 from the interiors thereof via a flow path (not illustrated) formed in the interior of each component.

The cooling air that has flowed into the region on the outer side in the radial direction of the blade ring 50 flows into the outer side in the radial direction of the outer shroud 43 and the ring segment 61 disposed on the inner side in the radial direction of the blade ring 50, and cools the outer shroud 43 and the ring segment 61. The cooling air that has flowed into the outer side in the radial direction of the outer shroud 43 flows into the front edge passage 421 and the rear edge passage 422 of the vane body 42 via a flow path (not illustrated) in the interior of the outer shroud 43. Subsequently, the cooling air flows from the front edge passage 421 into the connecting flow path 461 of the shroud 450.

The cover portion 48 is fitted into, welded, and fixed to the first channel portion 471. Accordingly, the cooling air that has flowed into the connecting flow path 461 flows into the main cooling flow path 462 formed by the second channel portion 472 and the channel portion blocking surface 481*a* of the cover portion 48. In the main cooling flow path 462 and the connecting flow path 461, the outer peripheral surface side turbulators 482 that protrude from the inner surfaces on the side end surface 452 sides and the front edge end surface 453 side, and the gas path surface side turbulators 473 that protrude from the inner surface on the gas path surface 451 side are formed. Thus, the cooling air that enters from the front edge passage 421 flows toward the rear edge end surface 454 while colliding with the outer peripheral surface side turbulators 482 and the gas path surface side turbulators 473. The cooling air inside the cooling flow path 46 flows from the front edge end surface 453 side in the axial direction Da, and is discharged from the opening of the rear edge end surface 454 to outside the shroud 450.

According to such a hot part of the gas turbine 1 described above, the outer peripheral surface side turbulators 482 that protrude from the inner surfaces on the side end surface 452 sides and the front edge end surface 453 side of the cooling flow path 46 are formed. Thus, cooling air flows through the cooling flow path 46 while colliding with the outer peripheral surface side turbulators 482. The collision of the cooling air with the outer peripheral surface side turbulators 482 makes it possible to disturb the flow of the cooling air so as to destroy a boundary layer of the cooling air that occurs along the channel portion blocking surface 481a of the cover portion 48, which serves as the inner surface on the side end surface 452 sides and the front edge end surface 453 side of the cooling flow path 46. Thus, the flow rate of the cooling air that flows near the channel portion blocking surface 481a increases, making it possible to improve the heat conductivity on the side end surface 452 sides and the front edge end surface 453 side. Accordingly, the side end surfaces 452 and the front edge end surface 453 that are exposed to the high-temperature combustion gas G that flows from the combustion gas flow path Pg into the gaps between the shrouds 450 adjacent to each other in the circumferential direction Dc and thus become high in temperature can be efficiently cooled.

The gas path surface side turbulators 473 that protrude from the inner surface on the gas path surface 451 side of the second channel portion 472 are formed. Thus, the cooling air inside the cooling flow path 46 flows while colliding with the gas path surface side turbulators 473. The collision of the cooling air with the gas path surface side turbulators 473 makes it possible to disturb the flow of the cooling air so as to destroy a boundary layer of the cooling air that occurs along the inner surface on the gas path surface 451 side of the second channel portion 472. Thus, the flow rate of the cooling air that flows near the inner surface on the gas path surface 451 side of the second channel portion 472 increases, making it possible to improve the heat conductivity on the gas path surface 451 side. Accordingly, the gas path surface 451 of the shroud 450 exposed to the high-temperature combustion gas G by facing the combustion gas flow path Pg can be efficiently cooled.

The main cooling flow path 462 is formed in the extension direction of the side end surfaces 452, making it possible to efficiently cool each of the side end surfaces 452 across its entirety. The connecting flow path 461 is formed in the extension direction of the front edge end surface 453, making it possible to efficiently cool the front edge end surface 453 across its entirety.

The cooling flow path 46 can be easily formed by blocking the channel portion 47 recessed from the side end surfaces 452 and the front edge end surface 453 by the cover portion 48. The outer peripheral surface side turbulators 482 are formed on the cover portion 48 separable from the shroud 450, making it possible to easily machine the outer peripheral surface side turbulators 482. Accordingly, the outer peripheral surface side turbulators 482 can be easily formed inside the cooling flow path 46 in any location and in any shape. As a result, the cooling flow path 46 capable of efficiently cooling the side end surfaces 452 and the front edge end surface 453 can be easily formed in the shroud 450.

The gas path surface side turbulators 473 that protrude from the inner surface on the gas path surface 451 side are formed on the second channel portion 472 hollowed from the side end surfaces 452 and the front edge end surface 453, thereby making it possible to easily form the gas path surface side turbulators 473. Specifically, the gas path surface side turbulators 473 are formed so as to protrude from the inner surface on the gas path surface 451 side connected to the opening of the second channel portion 472, making it possible to easily machine the gas path surface side turbulators 473 via the opening of the second channel portion 472 from the side end surface 452 sides and the front edge end surface 453 side. Accordingly, the gas path surface side turbulators 473 can be easily formed inside the cooling flow path 46 in any location and in any shape. As a result, the cooling flow path 46 capable of efficiently cooling the gas path surface 451 can be easily formed in the shroud 450.

According to such a gas turbine 1, the side end surfaces 452 and the front edge end surface 453 can be efficiently cooled, making it possible to efficiently utilize the cooling air. Thus, an amount of the portion of the compressed air supplied to the turbine 30 as cooling air can be decreased, making it possible to improve the efficiency of the gas turbine 1.

According to such a manufacturing method of a hot part of the gas turbine 1, it is possible to form the outer peripheral surface side turbulators 482 on the cover portion 48 in the cover portion forming step S2 while forming the first channel portion 471 and the second channel portion 472 from the side end surface 452 sides and the front edge end surface 453 side in the channel portion forming step S1. Thus, the outer peripheral surface side turbulators 482 are formed on the cover portion 48 separable from a main body of the shroud 450, making it possible to easily machine the outer peripheral surface side turbulators 482. In the cover portion fixing step S3, the cover portion 48 is welded and fixed to the first channel portion 471, and the opening of the second channel portion 472 is blocked by the channel portion blocking surface 481a of the cover portion 48. As a result, the cooling flow path 46 can be easily formed from the side end surface 452 sides and the front edge end surface 453 side. Accordingly, the cooling flow path 46 having the outer peripheral surface side turbulators 482 provided therein can be easily formed.

In the channel portion forming step S1, the gas path surface side turbulators 473 are carved from the side end surface 452 sides and the front edge end surface 453 side and formed along with the second channel portion 472, making it possible to easily form the gas path surface side turbulators 473. As a result, the cooling flow path 46 having the gas path surface side turbulators 473 provided therein can be easily formed.

[Second Embodiment]

Next, a hot part of the gas turbine 1 of a second embodiment will be described with reference to FIG. 5.

In the second embodiment, the same components as those in the first embodiment are denoted using the same symbols, and detailed descriptions thereof are omitted. The hot part of the gas turbine 1 of this second embodiment differs from the first embodiment in the configurations of the channel portion 47 and the cover portion 48. It should be noted that, in the second embodiment as well, the hot part is described using the shroud 450 as an example.

Figure 5:
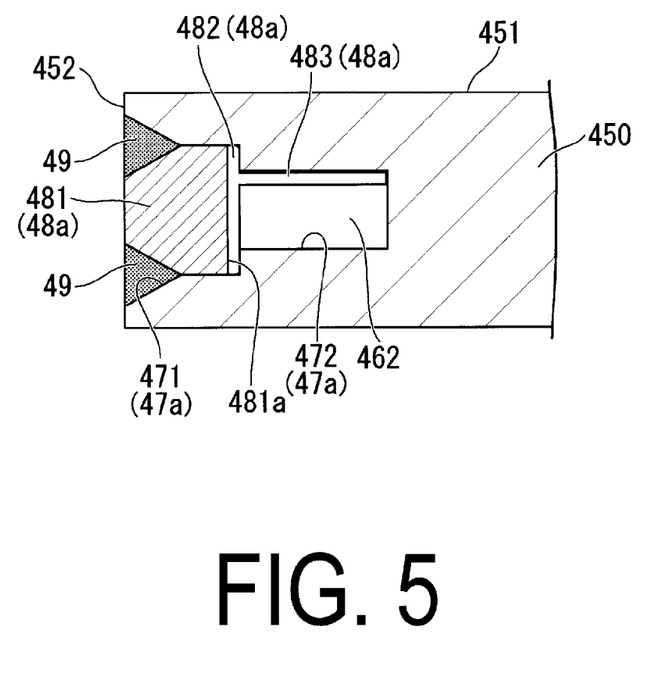
FIG. 5 is a cross-sectional view of a cooling flow path of a second embodiment of the present invention.

In the shroud 450 of the second embodiment, the gas path surface side turbulator 473 is formed on the cover portion 48 rather than the channel portion 47, as illustrated in FIG. 5. Specifically, the shroud 450 of the second embodiment includes a modified channel portion 47a on which the gas path surface side turbulators 473 are not formed, and a modified cover portion 48a on which the outer peripheral surface side turbulators 482 and the gas path surface side turbulators 473 are formed.

The modified channel portion 47a differs from the channel portion 47 of the first embodiment in that the modified channel portion 47a does not include the gas path surface side turbulator 473. The modified channel portion 47a of the present embodiment includes the first channel portion 471 and the second channel portion 472 having the same shapes as those of the channel portion 47.

The modified cover portion 48a differs from the cover portion 48 of the first embodiment in that the gas path surface side turbulators 473 are formed on the modified cover portion 48a. The modified cover portion 48a of the present embodiment includes the cover portion body 481, the outer peripheral surface side turbulator 482, and a modified gas path surface side turbulator 483 that protrudes further than the outer peripheral surface side turbulator 482 from the cover portion body 481. It should be noted that the cover portion body 481 and the outer peripheral surface side turbulator 482 form the same shapes as those in the first embodiment.

A plurality of the modified gas path surface side turbulators 483 are formed on the modified cover portion 48a so as to protrude from the inner surface on the gas path surface side 451 of the cooling flow path 46 with the modified cover portion 48a blocking the opening of the modified channel portion 47a. Specifically, the modified gas path surface side turbulators 483 of the present embodiment are formed in positions in which the outer peripheral surface side turbulators 482 of the cover portion body 481 are formed. The modified gas path surface side turbulators 483 protrude vertically from predetermined positions in the width direction of the channel portion blocking surface 481a, forming rectangular parallelepiped shapes. The predetermined positions in the width direction of the channel portion blocking surface 481a of the present embodiment are positions in which, with the cover portion body 481 fitted into the first channel portion 471, the modified gas path surface side turbulators 483 that protrude from the cover portion body 481 come into contact with the inner surface on the gas path surface 451 side of the second channel portion 472.

According to such a hot part of the gas turbine 1 as described above, the modified gas path surface side turbulators 483 are formed along with the outer peripheral surface side turbulators 482 on the cover portion 48 separable from the shroud 450, making it possible to easily machine the modified gas path surface side turbulators 483. The cooling flow path 46 can be formed by simply forming an angular channel, which is a simple cavity, on the side end surfaces 452 and the front edge end surface 453 as the modified channel portion 47a. Accordingly, the modified gas path surface side turbulators 483 can be easily formed inside the cooling flow path 46 in any location and in any shape. As a result, the cooling flow path 46 capable of efficiently cooling the gas path surface 451 can be more easily formed inside the shroud 450.

While the embodiments of the present invention have been described in detail with reference to the drawings, the configurations of each embodiment and the combinations thereof are merely examples, and additions, omissions, substitutions, and other changes may be made without deviating from the spirit and scope of the present invention. The present invention is not to be considered as being limited by the foregoing embodiments but is only limited by the scope of the appended claims.

It should be noted that while the hot part of the gas turbine 1 has been described using the shroud 450 as an example in the embodiments, the hot part of the gas turbine 1 of the present invention is not limited to the shroud 450. Examples of the hot part of the gas turbine 1 provided with a planar component may include the platform 38 of the blade 36 and the ring segment 61. The hot part of the gas turbine 1 need only be a component provided with a planar member having the gas path surface 451 that faces at least one of the inner side and the outer side in the radial direction Dr of the rotor axis Ar in the combustion gas flow path Pg.

Figure 6:
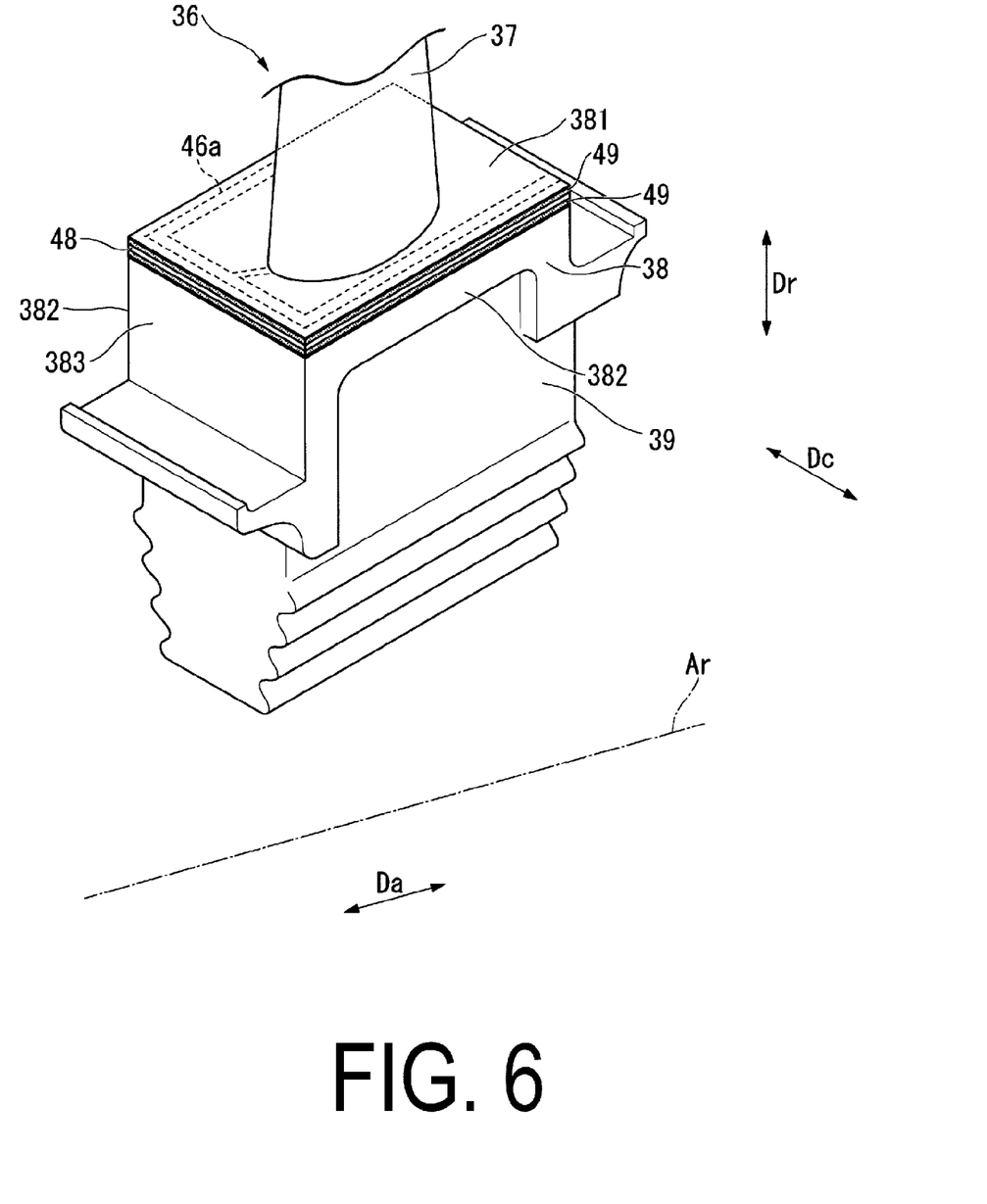
FIG. 6 is a schematic view illustrating an outline shape of a platform of a blade having a cooling flow path formed therein, as a modified example of the present invention.

Specifically, when the hot part of the gas turbine 1 provided with the planar component is the platform 38 of the blade 36, a cooling flow path 46a may be formed on a platform side end edge 382 side that is oriented in the circumferential direction Dc of the platform 38, and a platform front edge end surface 383 side that is oriented to the upstream side in the axial direction Da, as illustrated in FIG. 6.

Figure 7:
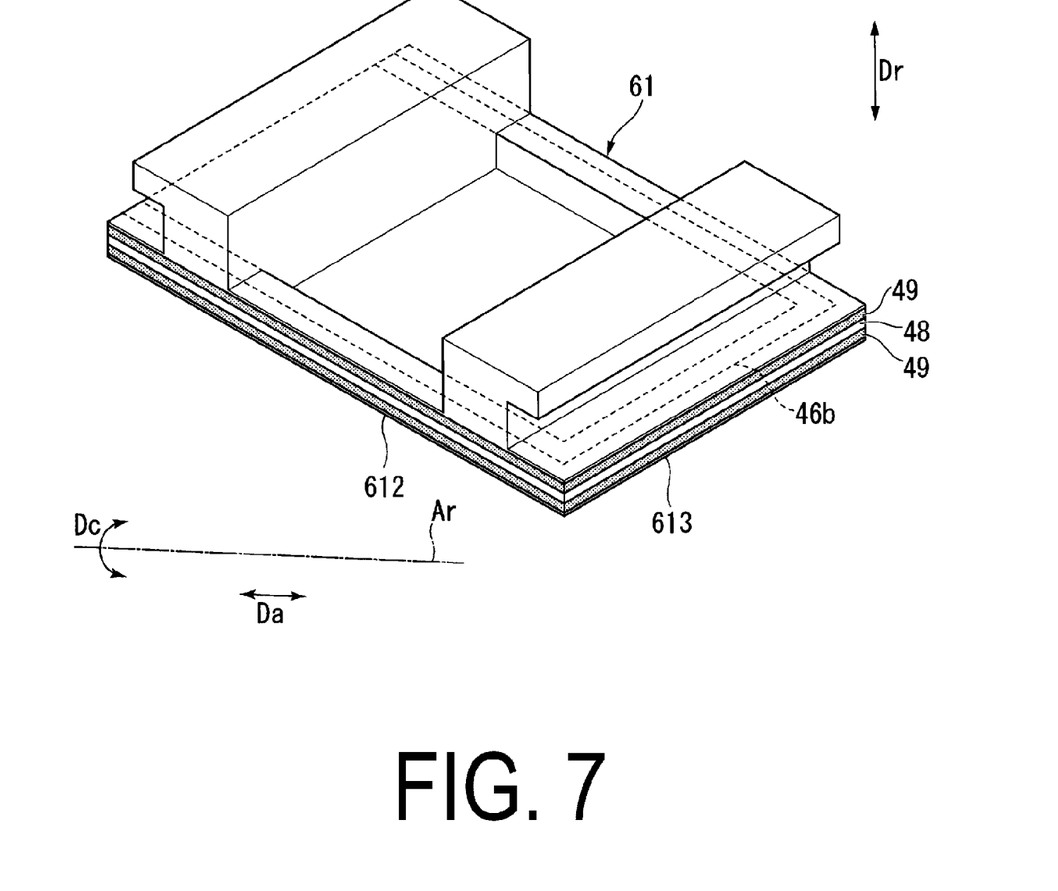
FIG. 7 is a schematic view illustrating an outline shape of a ring segment having a cooling flow path formed therein, as a modified example of the present invention.

When the hot part of the gas turbine 1 provided with the planar component is the ring segment 61, a cooling flow path 46b may be formed on a ring segment side end edge 612 side that is oriented in the circumferential direction Dc of the ring segment 61, and a ring segment front edge end surface 613 side that is oriented to the upstream side in the axial direction Da, as illustrated in FIG. 7.

The formation of the main cooling flow path 462 is not limited to formation along the side end surfaces 452 as in the present embodiment, and the main cooling flow path 462 need only be formed along the outer peripheral surface. For example, the main cooling flow path 462 may be formed along the front edge end surface 453 and the rear edge end surface 454 of the outer peripheral surface, or may be formed along all surfaces including the front edge end surface 453, the rear edge end surface 454, and the side end surfaces 452 so as to extend along the entire periphery of the outer peripheral surface. The formation of the main cooling flow path 462, even if the main cooling flow path 462 is formed along the side end surfaces 452, is not limited to formation along both the side end surfaces 452, and the main cooling flow path 462 may be formed along only one of the side end surfaces 452.

The shapes of the outer peripheral surface side turbulator 482 and the gas path surface side turbulator 473 are not limited to the shapes in the present embodiment, and the outer peripheral surface side turbulator 482 need only protrude from the outer peripheral surface side of the inner surface of the cooling flow path 46. For example, the gas path surface side turbulator 473 may protrude from the gas path surface 451 side of the inner surface of the cooling flow path 46.

The shape of the connecting flow path 461 of the cooling flow path 46 is not limited to such a shape as that in the present embodiment, and the connecting flow path 461 need only connect the front edge passage 421 of the vane body 42 with the main cooling flow path 462. For example, the connecting flow path 461, rather than having a shape that extends from the front edge passage 421 toward the front edge end surface 453, branches, and connects to the main cooling flow path 462, may be formed so that different connecting flow paths 461 are respectively connected to the main cooling flow paths 462 on both sides.

INDUSTRIAL APPLICABILITY

According to the hot part of a gas turbine described above, the cooling flow path having the outer peripheral side turbulator provided therein is formed in the interior of the hot part, making it possible to efficiently cool the outer peripheral surface thereof.

REFERENCE SIGNS LIST

1 Gas turbine
10 Compressor
20 Combustor
30 Turbine
Da Axial direction

Dc Circumferential direction
Dr Radial direction
31 Casing
Ar Rotor axis
33 Turbine rotor
34 Rotor body
35 Blade row
36 Blade
37 Blade body
38 Platform
39 Blade root
40 Vane row
41 Vane
42 Vane body
421 Front edge passage
422 Rear edge passage
43 Outer shroud
45 Inner shroud
451 Gas path surface
452 Side end surface
453 Front edge end surface
454 Rear edge end surface
46 Cooling flow path
461 Connecting flow path
462 Main cooling flow path
47 Channel portion
471 First channel portion
472 Second channel portion
473 Gas path surface side turbulator
48 Cover portion
481 Cover portion body
481a Channel portion blocking surface
482 Outer peripheral surface side turbulator
50 Blade ring
52 Heat shield ring
61 Ring segment
G Combustion gas
Pg Combustion gas flow path
S1 Channel portion forming step
S2 Cover portion forming step
S3 Cover portion fixing step
47a Modified channel portion
48a Modified cover portion
483 Modified gas path surface side turbulator
382 Platform side end edge
383 Platform front edge end surface
612 Ring segment side end edge
613 Ring segment front edge end surface

The invention claimed is:

1. A hot part of a gas turbine that defines a ring-shaped combustion gas flow path around a rotor, the combustion gas flow path having combustion gas flowing therethrough, the hot part comprising:
a planar member that includes a gas path surface, the gas path surface facing at least one of an inner side and an outer side in a radial direction of the rotor in the combustion gas flow path,
wherein the planar member includes a cooling flow path that is formed in an interior of the planar member along an outer peripheral surface that intersects the gas path surface, and an outer peripheral surface side turbulator that protrudes from an inner surface on the outer peripheral surface side of the cooling flow path, and
wherein the hot part further comprises a gas path surface side turbulator that protrudes from an inner surface on the gas path surface side of the cooling flow path.

2. The hot part of a gas turbine according to claim 1, wherein
the cooling flow path is formed by a channel portion recessed from the outer peripheral surface of the planar member, and a cover portion that blocks an opening of the channel portion; and
the outer peripheral surface side turbulator is provided on the cover portion.

3. The hot part of a gas turbine according to claim 1, wherein
the cooling flow path is formed by a channel portion recessed from the outer peripheral surface of the planar member, and a cover portion that blocks an opening of the channel portion;
the outer peripheral surface side turbulator is provided on the cover portion; and
the gas path surface side turbulator is provided on the channel portion.

4. The hot part of a gas turbine according to claim 1, wherein
the cooling flow path is formed by a channel portion recessed from the outer peripheral surface of the planar member, and a cover portion that blocks an opening of the channel portion; and
the outer peripheral surface side turbulator and the gas path surface side turbulator are provided on the cover portion.

5. A gas turbine comprising the hot part of a gas turbine according to claim 1.

6. A manufacturing method of a hot part of a gas turbine that defines a ring-shaped combustion gas flow path around a rotor, the combustion gas flow path having combustion gas flowing therethrough, the method comprising:
a channel portion forming step of forming a channel portion recessed from an outer peripheral surface that intersects a gas path surface along the outer peripheral surface in a planar member, the planar member including the gas path surface that faces at least one of an inner side and an outer side in a radial direction of the rotor in the combustion gas flow path;
a cover portion forming step of forming a cover portion that blocks an opening of the channel portion; and
a cover portion fixing step of fixing the cover portion to the channel portion;
the cover portion forming step forming an outer peripheral surface side turbulator that protrudes from the cover portion; and
the cover portion fixing step fixing the outer peripheral surface side turbulator toward the channel portion, wherein
the channel portion forming step forms a gas path surface side turbulator that protrudes from an inner surface on the gas path surface side of the channel portion by performing machining from the outer peripheral surface side.

* * * * *